G. W. KING.
Horse Hay Rake.
No. 47,553.
2 Sheets—Sheet 1.
Patented May 2, 1865.
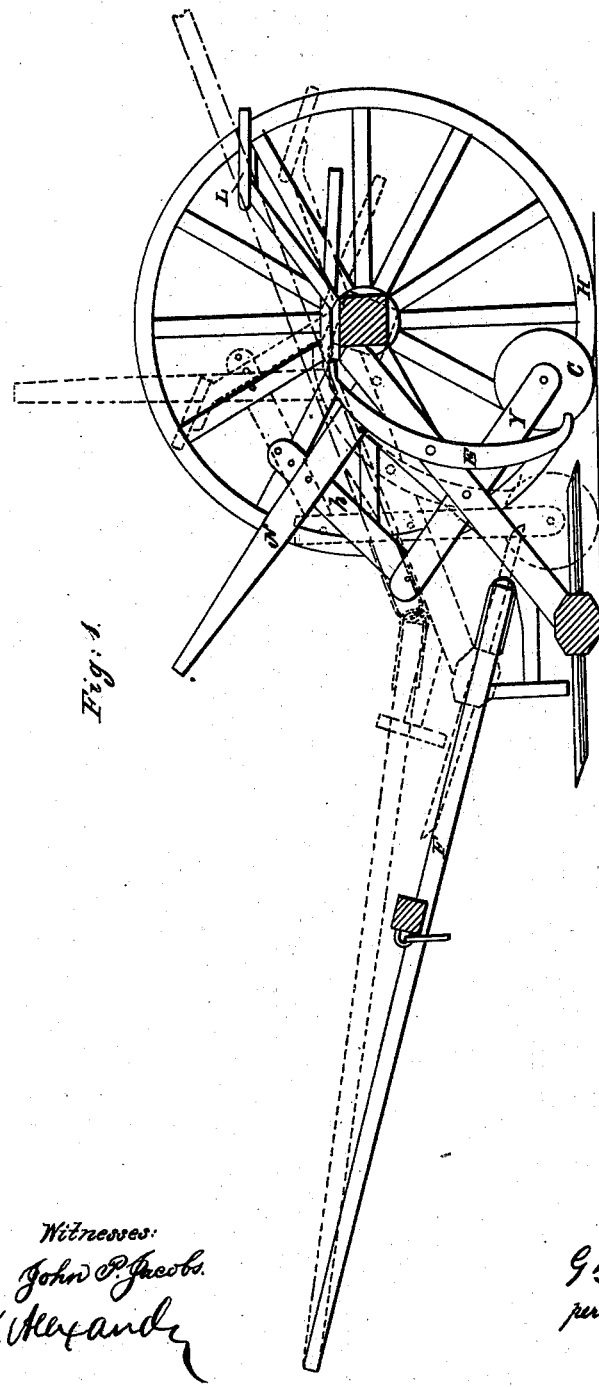
Witnesses:
John P. Jacobs.
C. L. Alexander
G. W. King
per J. H. Alexander Atty.

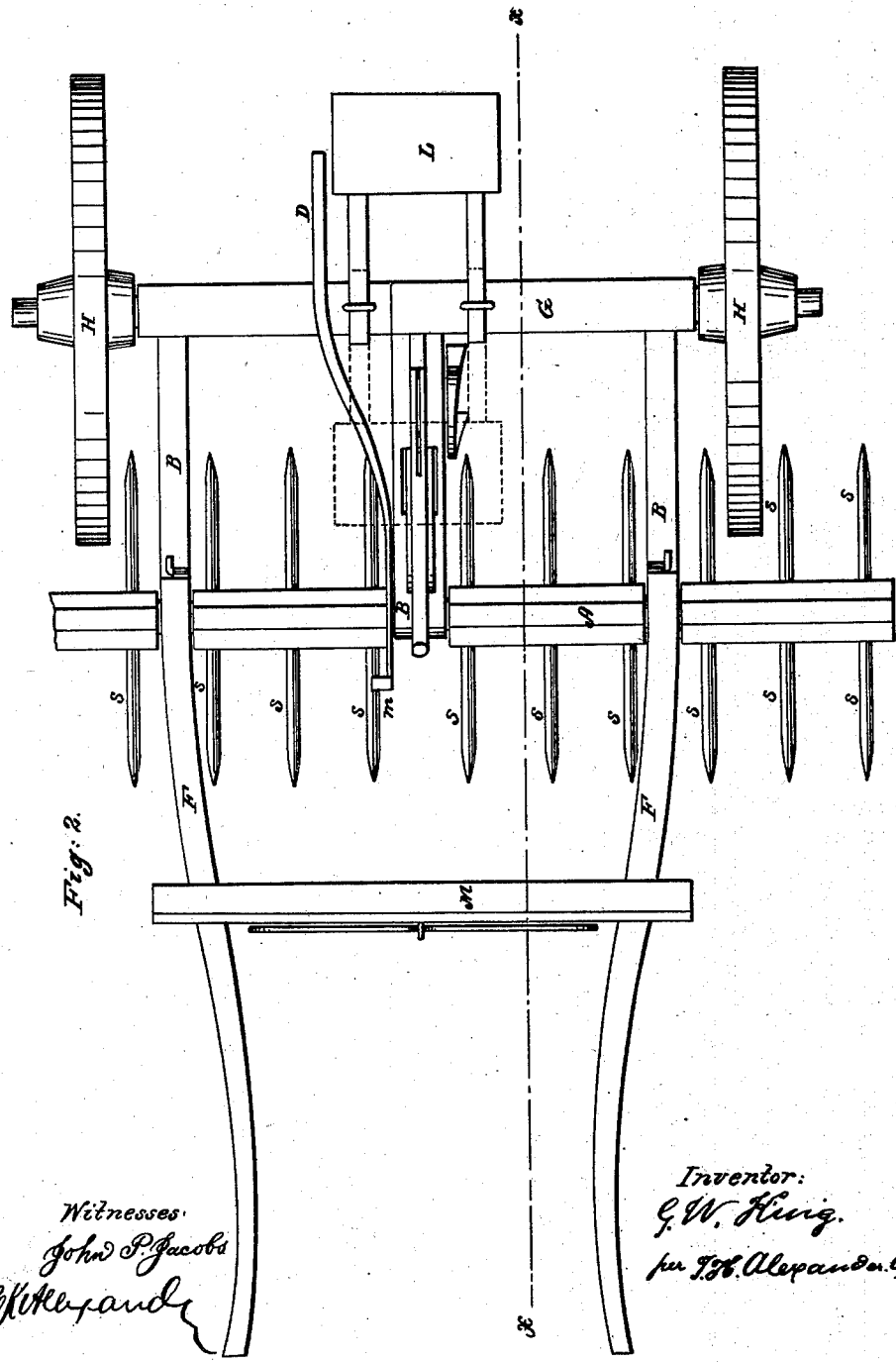

UNITED STATES PATENT OFFICE.

GEORGE W. KING, OF GREENVILLE, NEW YORK.

IMPROVEMENT IN HORSE HAY-RAKES.

Specification forming part of Letters Patent No. 47,553, dated May 2, 1865.

*To all whom it may concern:*

Be it known that I, GEORGE W. KING, of Greenville, Green county, in the State of New York, have invented certain new and useful Improvements in Combined Carts or Horse-Rakes; and I hereby declare that the following is a true and exact description of the same, reference being had to the accompanying drawings, and to the letters of reference marked thereon.

The nature of my invention consists in constructing an improved horse-rake.

Figure 1 represents a vertical section of my machine, taken in the dotted line $x\ x$. Fig. 2 exhibits a plan view of the same.

The body of my rake consists of the axle G, supported by the two wheels H H.

A represents the rake-head, securely attached to the axle G by the three braces B, one of the braces being at the center of the axle and one at each end of said axle G. The upper ends of braces B are immovably fastened to axle G and the lower ends banded, so as to embrace the rake-head A, the rake-head being constructed with depressions in it to receive the bands, and thus prevent them from slipping. The rake-head is furnished with the teeth $s$, sharpened at both ends and placed at a suitable distance apart.

It will be observed that the bands fit the rake-head so loosely as to admit of its free play.

The middle brace, B, has two mortises cut through it. The mortise nearest to the axle G is occupied by the lever N, which has for its fulcrum an iron bolt passing through it and through brace B. Into the lower mortise the arm Y is inserted, and is connected with lever N by the metal plate $h$. The arm Y is bifurcated at the lower end to receive the wheel C, which plays on an axle passing through it. It will be seen that by drawing the lever N back toward the driver's seat it brings the wheel C in contact with the earth, and thus elevates the rake-head A, so that it can pass over any obstructions that might be in the way.

E represents a curved lever, pivoted near its center to the side of brace B. The upper end of lever E extends to the top of the axle G, immediately in front of the driver's seat L. The lower end of E is designed to act on a tooth in the rake-head, so as to prevent the rake-head from revolving unnecessarily.

D represents a long lever, the upper end or long arm of which extends to the right of the driver's seat, and the short arm reaching a little beyond the rake-head, and having at its end a hammer-like attachment, $m$. Lever D has its fulcrum at the side of center brace, B.

F represents the shafts of my machine, which are strengthened by the cross-tie M, to which the horse is attached. The shafts F are hinged to the top of the two outer braces B, the hinges being so constructed as that the shafts can be reversed at pleasure.

L designates the driver's seat, which consists of a thick board, of suitable size, securely fastened to two legs that descend at an angle of about forty-five degrees toward the axle and terminate in two foot-like projections, which fit under staples driven in the axle G. By this construction the seat L can be in a moment reversed.

In operating my machine as a rake the shafts will be thrown in the direction of the rake-head A. As the machine advances the teeth $s$ must incline at a small angle toward the earth, and will penetrate beneath the layer of hay until a sufficient quantity is gathered to fill the space between the rake-head and the ends of the teeth. At this juncture the operator will raise the upper end of lever D with his right hand. The attachment $m$ will, by pressing upon one of the teeth $s$, force the points of all the teeth into the earth and give the rake-head a revolving motion, by which the hay already collected will be discharged. At the moment that lever D is pressing on the tooth $s$, as above described, the foot of the operator will be on lever E, the lower end of which will arrest the rake-head at a semi-revolution until the operator lowers the upper end of lever D. The tooth will then slip past lever E, and the rake-head, being unobstructed, will perform its entire revolution. The position of lever N when drawn back to press the wheel C against the earth is shown in dotted lines.

When it is designed to use my machine as a cart for transporting agricultural implements from one part of a farm to another, or for any purposes to which wheel-vehicles are applied, the required alterations can be made in a few moments. First push forward the lever N, so as to raise the wheel C from the earth, next place the rake-teeth in a horizontal position, then reverse the shafts and the driver's seat, and the object is accomplished.

Having thus described my invention, what I claim, and desire to secure by Letters Patent, is—

1. The lever N, in combination with plate h and arm Y, provided with wheel C, the whole arranged and operated in the manner substantially as and for the purpose herein set forth.

2. The lever D, in combination with lever E, arranged and operating as and for the purpose herein specified.

GEO. W. KING.

Witnesses:
E. WACKERHAGEN,
C. S. HICKOK.